Figure 1:
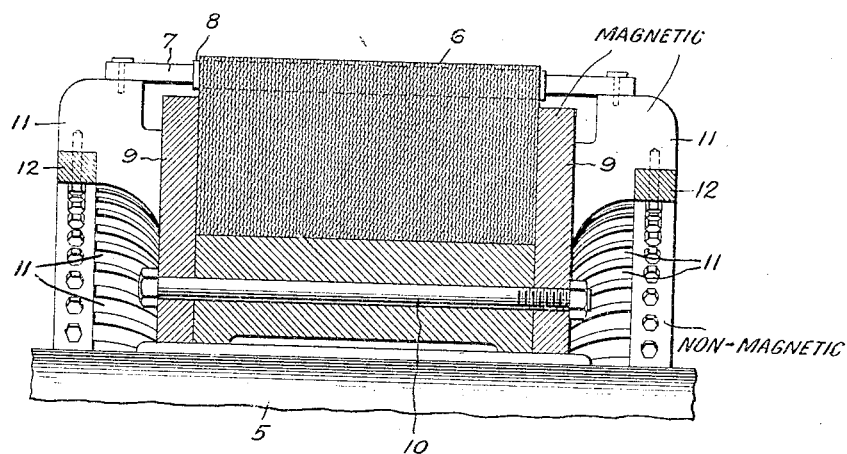

E. F. W. ALEXANDERSON.
INDUCTION MOTOR.
APPLICATION FILED JULY 10, 1913.

1,119,741.

Patented Dec. 1, 1914.

Witnesses:
Marcus L Byng
J. Ellis Glen

Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

INDUCTION-MOTOR.

1,119,741. Specification of Letters Patent. Patented Dec. 1, 1914.

Application filed July 10, 1913. Serial No. 778,253.

*To all whom it may concern:*

Be it known that I, ERNST F. W. ALEXANDERSON, a citizen of the United States, residing at Schenectady, county of Schenectady, State of New York, have invented certain new and useful Improvements in Induction-Motors, of which the following is a specification.

My invention relates to induction motors, and particularly to induction motors having secondary windings of the squirrel cage type.

It is well recognized in the art that in order to start an induction motor under load without excessive current flow, the secondary circuit of the motor should have a relatively high resistance, and, on the other hand, that when the motor is substantially up to speed, the resistance of the secondary circuit should be relatively low in order to secure efficient operating characteristics. It is, therefore, most desirable to provide an induction motor with a secondary winding whose effective resistance varies automatically as the slip of the motor varies. Such a characteristic is particularly desirable in the case of a secondary winding of the squirrel cage type, since this type of winding is the simplest and cheapest form of secondary winding for an induction motor.

Numerous expedients have heretofore been devised or suggested for providing a secondary winding for an induction motor having a resistance which automatically varies as the slip of the motor varies. In most of these devices advantage is taken of the difference in frequency of the induced secondary current at starting of the motor and when the motor is running at full speed. At starting, the frequency of the secondary current is high, while at substantially full speed, the frequency of the secondary current is low. A secondary winding, whose effective resistance varies as a direct function of the frequency of the secondary current, possesses the desirable characteristics above mentioned.

My invention more specifically relates to the secondary winding of the squirrel cage type of an induction motor and takes advantage of the well known principle of an inductively changing effective resistance as above discussed.

The object of my invention is to provide an improved construction of secondary winding for an induction motor.

More particularly, the object of my invention is to provide a secondary winding of the squirrel cage type of novel construction and possessing the characteristic feature of an inductively changing effective resistance. That is, my improved winding is so constructed and designed that the effective ohmic resistance of the winding varies with the slip, due to the inductive action of the secondary current.

Another object of my invention is to provide an end ring construction which shall also serve as a clamping plate for the laminated sheets of the magnetic body.

As heretofore suggested, I am well aware that a winding of this general character is not broadly new.

My invention consists in certain novel features of construction which my improved winding possesses. These novel features are definitely indicated in the claims appended hereto.

Figure 2:
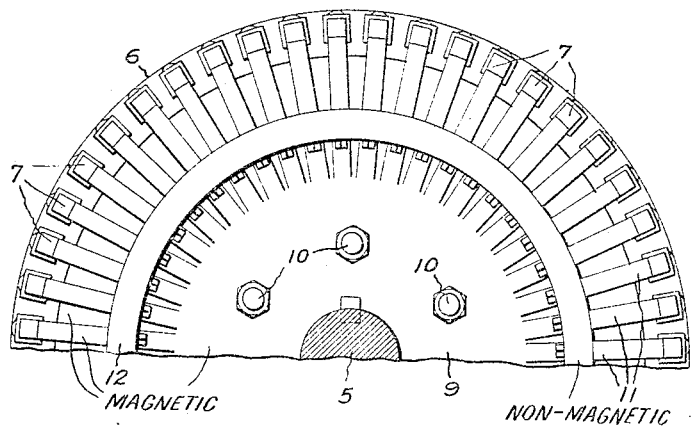

The details of construction and mode of operation of an induction motor embodying the features of my invention will be understood from the following description taken in connection with the accompanying drawings, in which:

Figure 1 is a sectional elevation of the rotor of an induction motor embodying my novel construction of secondary winding, and Fig. 2 is an end view of the same.

In the accompanying drawings I have illustrated my improved form of secondary winding carried in a magnetic body constituting the rotor of the motor. The primary winding of the motor has been omitted in the drawings since it is of the usual construction. The rotor comprises a shaft 5 mounted in suitable bearings and carries a magnetic body or core 6. This magnetic core is of the ordinary type and consists of a plurality of laminated sheets of magnetic material having suitable slots near the surface thereof.

Conductor bars 7 of copper or other good conducting material are located in the slots of the magnetic core. The portion of each conductor bar in contact with the magnetic core is surrounded with insulating material 8. The function of the insulating material is to prevent the flow of current through the magnetic core from one conductor bar to another. In my construction of winding an appreciable voltage exists between adjacent conductor bars, especially when the slip of the motor is high, and unless the conductor bars are insulated from the magnetic core the secondary current will flow from one conductor bar to another through the core.

The laminated sheets of the magnetic body or core 6 are held together by means of end plates 9 of magnetic material. Preferably the end plates 9 are made of iron, and are securely clamped to the laminated sheets, as for example, by means of bolts 10, thus binding the laminated sheets of the core rigidly together.

Magnetic vanes 11 are secured to each end plate. Preferably the magnetic vanes are integrally connected to the end plates 9, and the end plates 9 and vanes 11 may be an integral casting of magnetic material, as iron. Each end plate is provided with as many vanes as there are conductor bars, and each conductor bar is secured at each end to a vane of an end plate.

An end ring 12 of non-magnetic material, as for example copper, is bolted or otherwise rigidly secured to the vanes of each end plate. The end ring 12 is secured to the vanes at a point removed from the point of connection of the vanes to the conductor bars, so that the secondary current must flow through the vanes in passing from a conductor bar to the end ring.

The end plates 9 are of considerable cross-sectional area and constitute a magnetic end ring of low ohmic resistance for the squirrel cage winding. The vanes 11 are also of a sufficient cross-sectional area to have low ohmic resistance. Under normal full speed conditions the vanes 11 will provide paths of low resistance from the conductor bars to the end rings 12 and also to the end plates 9. Under such conditions the secondary winding operates as an ordinary squirrel cage winding.

The secondary current flowing from conductor bar to conductor bar in my improved winding passes down through one vane into the end plate 9 or into the end ring 12, and thence up through the appropriate vane to the conductor bar under the next adjacent pole. The current flowing in this path sets up a magnetic flux from pole to pole which bridges the gaps between the several intervening vanes. When the frequency of the secondary current is high, this flux is rapidly alternating, and by its inductive action tends to force the secondary current into that portion of the vanes farthest removed from the rotor body. Under these conditions the secondary current will tend to flow around the outer surface of the vanes to the end ring 12. We have, therefore, in substance a portion of the secondary current flowing in a circuit which is highly inductive, while the remaining, and by far larger portion of the secondary current, flows through a longer path which is of relatively high resistance because of its length and because of the skin effect phenomenon.

When the frequency of the secondary current is low, the current will take the shortest path from the conductor bars 8 to the end rings 12 and to the end plates 9. The entire mass of the vanes will be available to carry this current, and hence a path of low ohmic resistance is provided from the conductor bars to the end rings. When the frequency of the secondary current is high, the greatest portion of the current will be forced to flow around the outer surface of the vanes in a path whose effective ohmic resistance is relatively high. The presence of the magnetic material of the end plate and the vanes, together with the skin effect phenomenon, imparts to my novel construction of winding an effective ohmic resistance which varies with the frequency of the secondary current.

It will be understood of course that two low resistance end rings are not necessary in my improved secondary winding. The non-magnetic end ring 12 may be omitted if desired, but I have found from experiments that this end ring improves the operating characteristics of the motor. When this end ring is employed it carries the bulk of the secondary current under all conditions due to its low resistance.

The shape of the vanes 11 may be altered to suit conditions in practice. In general these vanes must have sufficient cross-sectional area to provide a path of low ohmic resistance for secondary current of low frequency, and must be proportioned to provide a path of considerable length around the outer surface thereof, or around that surface toward which the secondary current of high frequency is forced. That is to say the vanes are so designed that the path which current of high frequency is forced to follow is relatively long compared with the length of the path which current of low frequency can follow. Furthermore, the former path has considerably greater resistance per unit of length than the latter, due to skin effect.

While I have shown and described the best form of my invention now known to me, I desire to have it understood that many modifications may be made by those skilled in the art without departing in any way from the spirit of my invention as herein disclosed. I accordingly desire to cover in the annexed claims all such modifications that come within the spirit of my invention.

What I claim as new and desire to secure by Letters Patent of the United States, is:

1. In an induction motor, a secondary member comprising a magnetic body having slots therein, conductor bars in said slots, vanes of magnetic material secured to said conductor bars, said vanes being of low ohmic resistance and proportioned to provide a relatively long path for the flow of current of high frequency, and a relatively short path for the flow of current of low frequency, and a low resistance end ring electrically connected to the vanes secured to the same end of the conductor bars.

2. In an induction motor, a secondary member comprising a magnetic body having slots therein, conductor bars in said slots, vanes of magnetic material secured to said conductor bars, said vanes being of considerable cross-sectional area so as to have low ohmic resistance and having an outer surface on the side removed from said magnetic body of relatively great length toward which secondary current of high frequency is forced, and a low resistance end ring secured to said vanes at a point removed from the point of connection of the conductor bars to the vanes, such that the straight line distance between said points is appreciably less than the distance around said outer surface.

3. In an induction motor, a secondary member comprising a magnetic body having slots therein, conductor bars in said slots, vanes of magnetic material secured to said conductor bars, said vanes being proportioned to provide a relatively short path of low ohmic resistance per unit of length for secondary current of low frequency and a relatively long path of high ohmic resistance per unit of length for secondary current of high frequency, and a low resistance end ring secured to said vanes at a point removed from the point of connection of conductor bars to the vanes.

4. In an induction motor, a magnetic body, a squirrel cage winding carried thereon comprising conductor bars, means for electrically interconnecting one end of the bars, a low resistance magnetic end ring and a low resistance non-magnetic end ring adjacent the other end of said bars, and electrical connecting means of inductively changing effective resistance between this end of said bars and both adjacent end rings.

5. In an induction motor, a secondary member comprising a magnetic body having slots therein, conductor bars in said slots, a low resistance magnetic end ring and a low resistance non-magnetic end ring at each end of said magnetic body, and electrical connecting means of inductively changing effective resistance between one end of each conductor bar and both adjacent end rings.

6. In an induction motor, a secondary member comprising a magnetic body having slots therein, conductor bars in said slots, a vane of magnetic material secured to each end of each conductor bar, and means comprising a low resistance non-magnetic end ring for electrically connecting the vanes secured to the same end of the conductor bars.

7. In an induction motor, a secondary member comprising a magnetic body having slots therein, an end ring of magnetic material at each end of said body, a plurality of vanes of magnetic material integrally secured to each end ring, conductor bars in said slot and secured to a vane of each end ring, and a non-magnetic end ring of low resistance secured to said vanes at a point removed from the point of connection of said conductor bars to said vanes.

8. In an induction motor, a secondary member comprising a magnetic body having slots therein, conductor bars in said slots, insulating material surrounding the portion of said conductor bars in contact with said magnetic body, vanes of magnetic material secured to each end of each conductor bar, means comprising magnetic material of low ohmic resistance for electrically connecting the vanes secured to the adjacent ends of the conductor bars, and a non-magnetic end ring of low ohmic resistance connected to those vanes which are secured to the adjacent ends of the conductor bars, said ring being connected to said vanes at a point removed from the point of connection of the vanes to the conductor bars.

9. In an induction motor, a body comprising laminated sheets of magnetic material, end plates of low resistance magnetic material, means for forcing said plates together to tightly clamp said sheets, vanes integrally formed on said plates, transverse slots in said sheets, conductor bars located therein, the ends of said conductor bars being electrically connected to said vanes at a point remote from the point of connection between the vanes and the coacting plate.

10. In an induction motor, a rotor comprising a shaft, a magnetic core surrounding said shaft made up of laminated sheets of magnetic material, end plates of low resistance magnetic material abutting said core, means for clamping said plates and sheets together, transverse slots in said core, conductor bars in said slots, vanes integrally formed on said end plates and projecting outwardly therefrom in a direction parallel with the axis of said shaft, means for electrically connecting said bars to said vanes at a point remote from said plates, non-magnetic low resistance end rings, and means for electrically connecting said end rings to said vanes at a point remote from the points of connection between the bars and vanes and between the vanes and coacting plate.

In witness whereof, I have hereunto set my hand this 8th day of July, 1913.

ERNST F. W. ALEXANDERSON.

Witnesses:
 BENJAMIN B. HULL,
 HELEN ORFORD.